(12) United States Patent
Houh et al.

(10) Patent No.: US 6,967,963 B1
(45) Date of Patent: Nov. 22, 2005

(54) TELECOMMUNICATION METHOD FOR ENSURING ON-TIME DELIVERY OF PACKETS CONTAINING TIME-SENSITIVE DATA

(75) Inventors: Henry H. Houh, Lexington, MA (US); Pehr Anderson, Boston, MA (US); Christopher Gadda, Palo Alto, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/204,102

(22) Filed: Dec. 1, 1998

(51) Int. Cl.$^7$ .......................... H04L 12/54; H04J 3/02
(52) U.S. Cl. ..................................... 370/428; 370/462
(58) Field of Search ...................... 370/229, 235, 370/387, 412, 413, 417, 428, 429, 468, 415, 370/400, 230, 431, 445, 447, 448, 462

(56) References Cited

U.S. PATENT DOCUMENTS

| | | | |
|---|---|---|---|
| 4,100,377 A | 7/1978 | Flanagan | 179/15 AS |
| 4,507,782 A | 3/1985 | Kunimasa et al. | 371/32 |
| 4,516,239 A * | 5/1985 | Maxemchuk | 370/445 |
| 4,546,212 A | 10/1985 | Crowder, Sr. | 179/2 |
| 4,581,735 A | 4/1986 | Flamm et al. | 370/85 |
| 4,712,214 A | 12/1987 | Meltzer et al. | 371/32 |
| 4,771,425 A | 9/1988 | Baran et al. | 370/85 |
| 4,841,526 A | 6/1989 | Wilson et al. | 371/32 |
| 4,870,661 A | 9/1989 | Yamada et al. | 375/122 |
| 4,885,749 A | 12/1989 | Golden | 371/32 |
| 4,888,767 A | 12/1989 | Furuya et al. | 370/95.2 |
| 4,903,261 A | 2/1990 | Baran et al. | 370/94.2 |
| 4,908,828 A | 3/1990 | Tikalsky | 371/69.1 |
| 4,918,690 A * | 4/1990 | Markkula, Jr. et al. | 370/400 |
| 4,947,484 A | 8/1990 | Twitty et al. | 371/37.1 |
| 4,970,714 A | 11/1990 | Chen et al. | 370/17 |
| 4,985,892 A | 1/1991 | Camarata | 370/123 |
| 5,010,553 A | 4/1991 | Scheller et al. | 371/35 |
| 5,084,877 A | 1/1992 | Netravali et al. | 371/32 |
| 5,103,467 A | 4/1992 | Bedlek et al. | 375/118 |
| 5,148,429 A | 9/1992 | Kudo et al. | 370/9.42 |
| 5,168,497 A | 12/1992 | Ozaki et al. | 370/94.1 |

(Continued)

OTHER PUBLICATIONS

Matthew G. Naugle, "Network Protocol Handbook" (Chapters I & II), McGraw-Hill, Inc, no date.

(Continued)

*Primary Examiner*—Seema S. Rao
*Assistant Examiner*—Kevin C. Harper
(74) *Attorney, Agent, or Firm*—McGlew and Tuttle, P.C.

(57) ABSTRACT

A telecommunication method for providing packets to at least one of a first and a second network are described. A telephone set connects the first network to the second network. The telephone set forwards packets received from one network to the other network, generates packets from signals locally inputted into the telephone set and forwards such generated packets to at least one of the networks, and performs actions prescribed by packets received by and addressed to the telephone set. Packets addressed to the telephone set may or may not be forwarded. On-time delivery of voice data packets is ensured by limiting the time that such packets can await transmission onto the network. When the time for forwarding a voice data packet exceeds a permitted time limit, that packet can be replaced by a new packet. The new packet can include the same or different data as the replaced packet.

25 Claims, 7 Drawing Sheets

U.S. PATENT DOCUMENTS

| | | | |
|---|---|---|---|
| 5,179,557 A * | 1/1993 | Kudo | 370/412 |
| 5,191,583 A | 3/1993 | Pearson et al. | 370/94.1 |
| 5,268,900 A * | 12/1993 | Hluchyj et al. | 370/429 |
| 5,287,182 A | 2/1994 | Haskell et al. | 348/500 |
| 5,386,438 A | 1/1995 | England | 375/121 |
| 5,412,642 A | 5/1995 | Nunokawa | 370/17 |
| 5,426,643 A * | 6/1995 | Smolinske et al. | 370/354 |
| 5,526,353 A | 6/1996 | Henley et al. | 370/60.1 |
| 5,533,108 A | 7/1996 | Harris et al. | 379/201 |
| 5,533,115 A | 7/1996 | Hollenbach et al. | 379/220 |
| 5,577,046 A * | 11/1996 | Diachina et al. | 370/252 |
| 5,699,519 A * | 12/1997 | Shiobara | 370/230 |
| 5,991,303 A * | 11/1999 | Mills | 370/402 |
| 6,021,124 A * | 2/2000 | Haartsen | 370/336 |
| 6,327,254 B1 * | 12/2001 | Chuah | 370/322 |
| 6,483,838 B1 * | 11/2002 | Ostman et al. | 370/395.31 |

OTHER PUBLICATIONS

Edwin R. Coover, "Tutorial Digital Private Branch Exchanges (PBXs)"; IEEE pp 5-16 & Glossary (1989), no month.

The Ethernet Management Guide, Third Edition, Martin Nemzow, McGraw Hill Series on Computer Communications (1995)—TCP/IP for Everyone, Loshin, Academic Press (1995).

Ethernet Network Questions and Answers Summarized from UseNet Group; Version 2.12 of 13 (1994).

Voice Over Frame Relay? No Problem (Data Communications) Mar. 1993 pp 16-17.

Packet Video and Audio Via SMDS; SMDS Today, pp 25 (1993).

* cited by examiner

TELECOMMUNICATION METHOD FOR ENSURING ON-TIME DELIVERY OF PACKETS CONTAINING TIME-SENSITIVE DATA

FIELD OF THE INVENTION

The invention relates generally to an apparatus and method for integrating voice and data on a single telecommunication network. More specifically, the invention relates to a telecommunication apparatus and method for forwarding voice and data packets to the network on communication paths having separate collision domains.

BACKGROUND OF THE INVENTION

Many modern businesses use two separate telecommunication networks for voice and for data. The costs associated with installing and maintaining two networks have induced some businesses to seek ways to integrate voice and data on a single telecommunication network infrastructure. As a result, the telecommunications industry has produced systems that integrate telephones and computers onto the same network. In such systems, telephones and computers share the same cabling infrastructure for transmitting voice data and computer data.

Advances in technology, though, continually increase the data rate capability of networks. The Ethernet network, which is a prevalent type of local area network (LAN), is an example. Devices (or nodes) connected to an Ethernet network communicate with each other using packets having a structured format. The packets include a destination address, a source address, and the data. Initially, the 10 Mbps Ethernet network was the basis for the IEEE 802.3 standard, but Ethernet has since evolved to support network data rates of 100 and 1,000 Mbps. While current implementations of integrated telecommunication systems can adequately support network data rates of an order of 10 Mbps, such systems cannot adequately provide equivalent functionality at network speeds of 100 Mbps and beyond. This is due, in part, to the use of hubs by current implementations of integrated telecommunication systems to forward Ethernet packets on the LAN. A hub is a network device that deposits Ethernet packets received on one communication path onto another communication path. Many communication paths can meet at a hub. Because a hub does not provide separate collision domains, the devices using these communication paths compete against each other for use of the hub. A collision domain is a segment of the LAN where a collision occurs when any two devices attempt to transmit packets simultaneously on that segment.

When a packet collision occurs on a segment, the devices sending the packets become alerted to the collision and "back off," that is, the sending devices wait a predetermined period of time before attempting to complete the transmission of the packets on that segment. The IEEE 802.3 standard specifies a back-off algorithm that each sending device must perform to be compliant with the standard when involved in a packet collision.

A problem, however, is that at high data rates (e.g., 100 Mbps data rates and beyond), a sending device can incorrectly deem a packet transmission to have been successful although that packet later encounters a collision after propagating through the network. Normally, at lower data rates (e.g., 10 Mbps), this collision causes the sending device to back-off on future attempts to transmit the packet. However, the high data rates enable the sending device to complete the packet transmission before the collision occurs or is detected. Further, the sending device may even have continued to transmit other packets on that network segment. At high data rates, the propagation delay incurred in the network can prevent the timely detection of collisions and render the operation of the integrated telecommunication system impracticable.

SUMMARY

In one aspect, the invention features a method for forwarding packets to a network that facilitates on-time delivery of such packets. Attempts are made to forward a packet stored in memory to the network. A time limit is established within which to forward the packet stored in the memory to the network. An elapsed period of time is monitored while attempting to forward the stored packet. When the elapsed period of time exceeds the time limit, it is determined whether to cancel attempts to forward the packet to the network. When the packet is currently being transmitted over the network, the transmission can be interrupted or allowed to complete. When the packet is not currently being transmitted over the network, attempts to transmit the packet can be canceled or permitted to continue.

When it is determined to cancel attempts to forward the stored packet, a new packet replaces the packet stored in the memory. The new packet can have the same data or different data than the replaced packet. The packet stored in memory can include time-sensitive data and protocol-related data. The new packet can have the same time-sensitive data and different protocol-related data than the replaced packet, or different time-sensitive data and the same protocol-related data as the replaced packet. Also, a back-off level can be reset for forwarding the new packet to the network, and a limit can be placed on the number of times the stored packet can be replaced with a new packet.

BRIEF DESCRIPTION OF THE DRAWINGS

The invention is pointed out with particularity in the appended claims. The above and further advantages of the invention may be better understood by referring to the following description in conjunction with the accompanying drawings, in which:

DETAILED DESCRIPTION OF THE INVENTION

Figure 1:
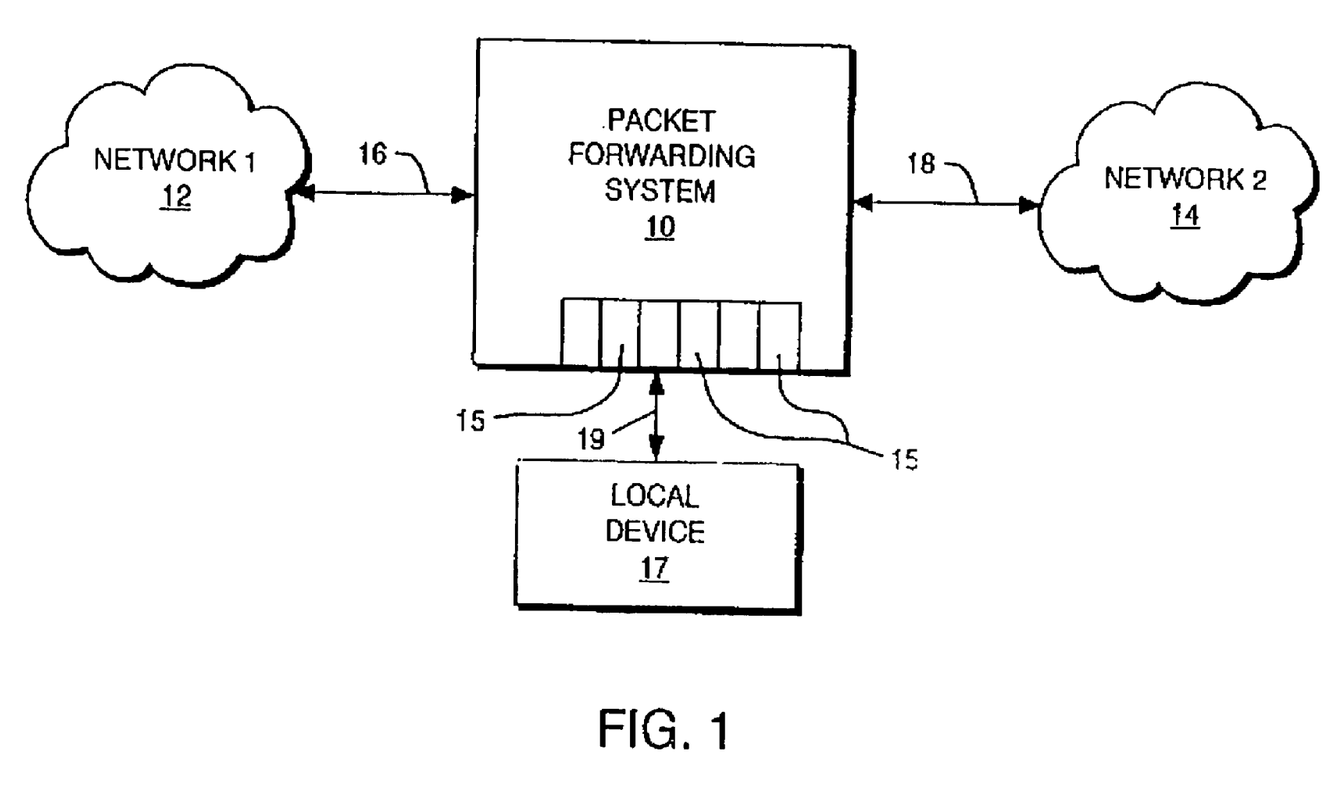
FIG. 1 is a diagram of an embodiment of two separate networks connected by a packet forwarding system in which the invention is practiced.

FIG. 1 shows a packet forwarding system 10 of the invention connected between a first network 12 and a second network 14 by electrical communication paths 16 and 18, respectively. Each of the networks 12, 14 can have any one of a variety of communication topologies, e.g., a local area network (LAN) or a wide area network (WAN). In one embodiment, the packet forwarding system 10 is the only electrical connection between the network 12 and the network 14.

In FIG. 1, each electrical communication path 16, 18 is a network segment that is part of a distinct collision domain. More specifically, the collision domain that includes the network 12 and the communication path 16 is separate from the collision domain that includes the network 14 and the communication path 18. According to the principles of the invention, the packet forwarding system 10 maintains the separation of the two collision domains.

The packet forwarding system 10 includes input/output (I/O) devices 15 for transmitting signals to and receiving signals from a local device 17. In one embodiment, the I/O devices 15 includes a microphone, a keypad, and a telephone handset. Other I/O devices are possible, (e.g., a headset). The I/O devices 15 also include a liquid crystal display (LCD), light-emitting diodes (LEDs), speakers, and the telephone handset. Other types of I/O devices can be used to practice the invention. The local device 17 can be any device capable of using the I/O devices 15 to receive signals from or transmit signals to the packet forwarding system 10 (e.g., a computer or a human operator). The packet forwarding system 10 can also include a first codec (not shown) coupled to the microphone and the speakers and a second codec (not shown) coupled to the telephone handset for performing analog-to-digital and digital-to-analog conversions of audio signals.

According to the principles of the invention, the packet forwarding system 10 uses and/or forwards packets received from one of the networks to the other of the networks. More specifically, the packet forwarding system 10 uses and/or forwards packets received from the network 12 to the network 14 and uses and/or forwards packets received from the network 14 to the network 12. For example, some received packets may specifically target the packet forwarding system 10 (e.g., the destination address in such packets is the address for the system 10). In this event, the packet forwarding system 10 uses but does not forward these packets to one of the networks 12, 14. In another embodiment, the packet forwarding system 10 uses and forwards the packets. Other types of received packets, (e.g., broadcast packets), can be of interest to and used by the packet forwarding system 10.

Packets can also originate at the packet forwarding system 10, such as when a user places a telephone call. To place the telephone call, the user presses several keys on the keypad and speaks into the handset. The packet forwarding system 10 generates packets from the signals produced by the keypad and the handset and forwards the generated packets to either or both of the networks 12, 14. The contents of such packets depend upon the source of the signals. For the audio (i.e., voice) signals, the generated packets include voice data. For the digital signals produced by the keypad, the generated packets include control data. The packet forwarding system 10 can also initiate the generation of packets (e.g., to issue an alarm or other types of status packets).

As described further below, the packet forwarding system 10 may add a priority level to the packets, with the level of priority depending upon the type of data included in such packets. In general, there are at least two levels of priority. In one detailed embodiment, a packet has one of three levels of priority: high, medium, and non-prioritized (i.e., no priority given to the packet). In one embodiment, the level of priority effects the order in which the packet forwarding system 10 queues in memory the associated packets for transmission to one of the networks 12, 14. In another embodiment, the priority determines the order in which the packets are removed from memory when forwarding to one of the networks 12, 14.

The packet forwarding system 10 can detect when the networks 12, 14 are inadvertently connected to each other by a path other than through the packet forwarding system 10. In one embodiment, the packet forwarding system 10 periodically transmits a packet via one of the communication paths 16, 18 and determines whether that packet returns to the packet forwarding system 10 via the other communication path. In another embodiment, the packet forwarding system can determine that identical packets have arrived from both communication paths 16, 18 at almost the same time. The packet forwarding system 10 can display a warning on the LCD and disable communication via one of the two communication paths 16, 18 until the inadvertent connection is disconnected. Notwithstanding, it is to be understood that the principles of the invention can be practiced even though the networks 12, 14 are inadvertently connected.

Figure 2:
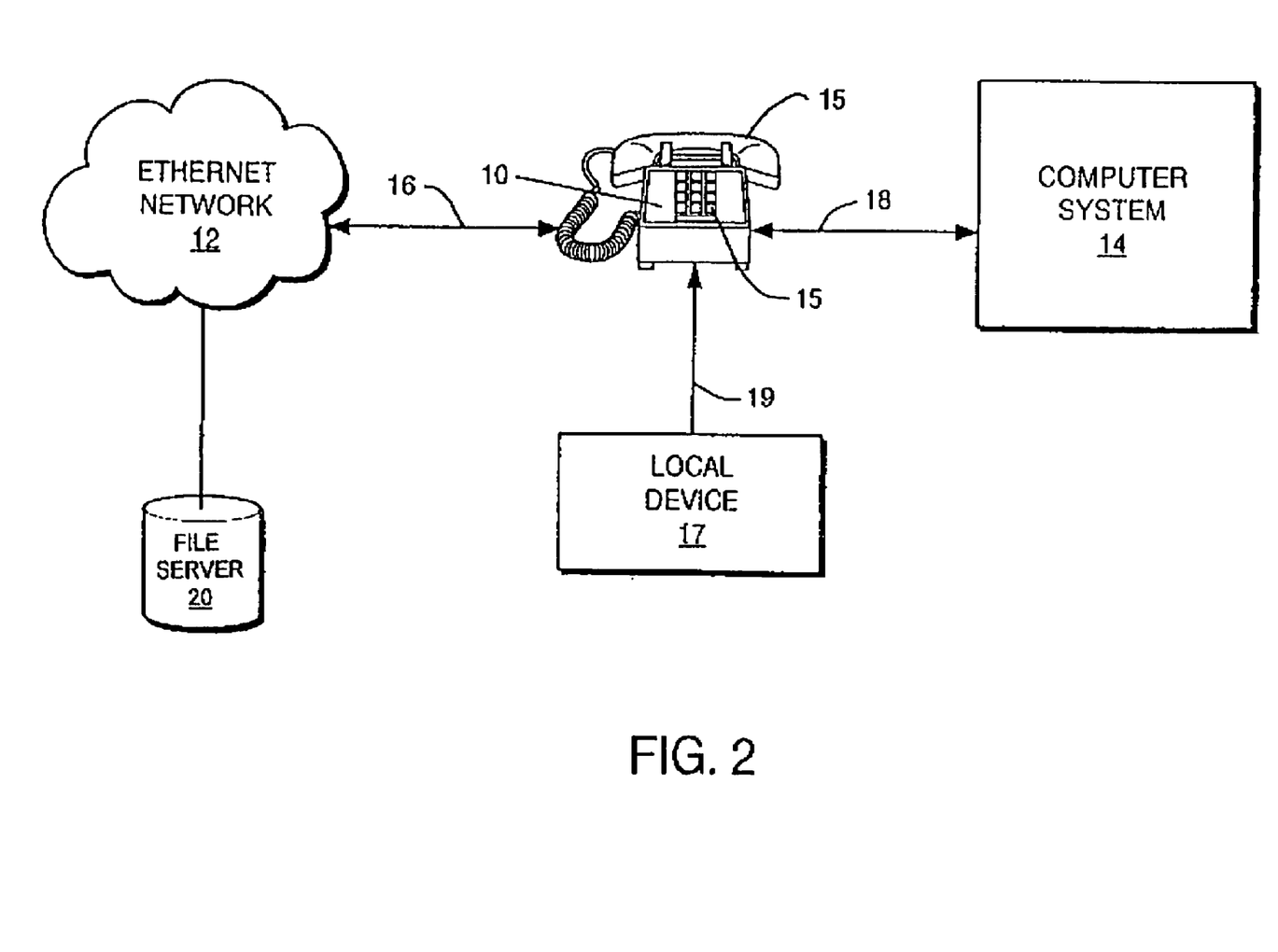
FIG. 2 is a diagram of an embodiment of the packet forwarding system of FIG. 1 coupled between a computer system and an Ethernet network.

FIG. 2 depicts an exemplary embodiment of the packet forwarding system 10 as a telecommunication device 10 bridging two Ethernet networks 12 and 14. Examples of telecommunication devices include a telephone set and a telephone line interface module (TLIM) device. For exemplary purposes, the telecommunication device throughout the following description is a telephone set (hereafter, telephone set 10). The first network 12 is an Ethernet network including a file server 20, and the second network 14 is a computer system 14. The computer system 14 plugs into a receptacle of the telephone set 10. Thus, a single network infrastructure supports both computers and telephones. Although only one telephone set is shown, it should be understood that multiple telephone sets, each of which can be coupled to computer systems, can be similarly connected to the Ethernet network 12.

The computer system 14 can access the file server 20 through the packet forwarding operation provided by the telephone set 10. To request access to the server 20, the computer system 14 transmits Ethernet packets including the destination address of the server 20 to the telephone set 10 via the communication path 18. Upon receiving the packets, the telephone set 10 determines that the packets are not directed to the telephone set 10, and queues the packets for transmission to the network 12 via communication path 16.

Concurrent with this request by the computer system 14, a user of the telephone set 10 may be holding a telephone conversation with the user of another telephone set (not shown) connected to the network 12. The audio signals enter the telephone set 10 through one of the I/O devices 15, (e.g., the handset). From these audio signals, the telephone set 10 produces packets including voice data. Because voice data are time-sensitive (i.e., as time elapses the usefulness of the voice data decreases significantly), the telephone set 10 can give higher priority to packets including voice data than packets including control data, such as the server request made by the computer system 14. Consequently, the telephone set 10 may preempt the transmission of the packets representing the server request and first queue the voice data packets for transmission.

While the telephone set 10 prepares to transmit the voice data packets to the network 12, voice data packets generated by the other telephone set engaged in the conversation may be received by the telephone set 10 via the communication path 16. The destination addresses in these voice data packets can indicate that the telephone set 10 is the targeted recipient. In this event, the telephone set 10 produces audio signals from the voice data in the packets and outputs the audio signals to one of the I/O devices 15, (e.g., the handset). As a result, the user of the telephone set 10 hears the audio signals generated by the other user. The telephone set 10 can then discard the received voice data packets or forward the packets to the computer system 14.

The user of the telephone set 10 can engage in a "conference call" (i.e., a conversation with users of two or more other telephone sets connected to the network 12). From audio signals produced by the user, the telephone set 10 generates packets including voice data. The telephone set 10 then transmits the generated packets to the network 12.

In one embodiment, each telephone set involved in the conference call receives a list of all participants at the start of the conference call. This list of participants can be generated prior to the start of the conference call and can change as participants are added or dropped. The telephone set 10 generates a unicast packet for each other telephone set on the list of participants. For example, when the telephone set 10 is engaged in a conference call with two other participants, the telephone set 10 generates two unicast packets having the same voice data and the telephone set 10 as the source address. The destination address in one of the two unicast packets is the address of one of the two other telephone sets, and the destination address in the second unicast packet is the other of the two other telephone sets.

In another embodiment, at the start of the conference call, each telephone set receives an identifier associated with the conference call. This identifier can be generated prior to the start of the conference call and can change during the conference call. The telephone set 10 generates multi-cast packets that include the identifier associated with the conference call. In each multi-cast packet, the telephone set 10 is the source address and the identifier can be the destination address.

The telephone set 10 uses only those packets from telephone sets known to be engaged in the conference call. For unicast packets, the source address of the received packets can be compared against the list of participants. For multi-cast packets, the identifier can indicate whether the packet came from a participant of the conference call.

When the telephone set 10 receives a packet, the telephone set 10 determines that the packet came from a participant in the conference call, produces audio signals corresponding to the voice data in the packet, and outputs the audio signals to the handset (or speaker). When multiple packets arrive at a telephone set from different sources, that telephone set combines the received packets and outputs audio signals corresponding to the voice data of the combination. The telephone set 10 can combine packets received from other telephone sets with packets generated by the telephone set 10 from locally received audio signals.

To produce the combination, the telephone set 10 can combine the voice data of the received packets or select for processing (i.e., producing audio signals from the voice data packets) one or more of the packets according to a predetermined criteria. One criteria can be to process the packet with the voice data having the highest volume (i.e., loudest). The telephone set 10 can discard or forward unused voice data packets.

Figure 3:
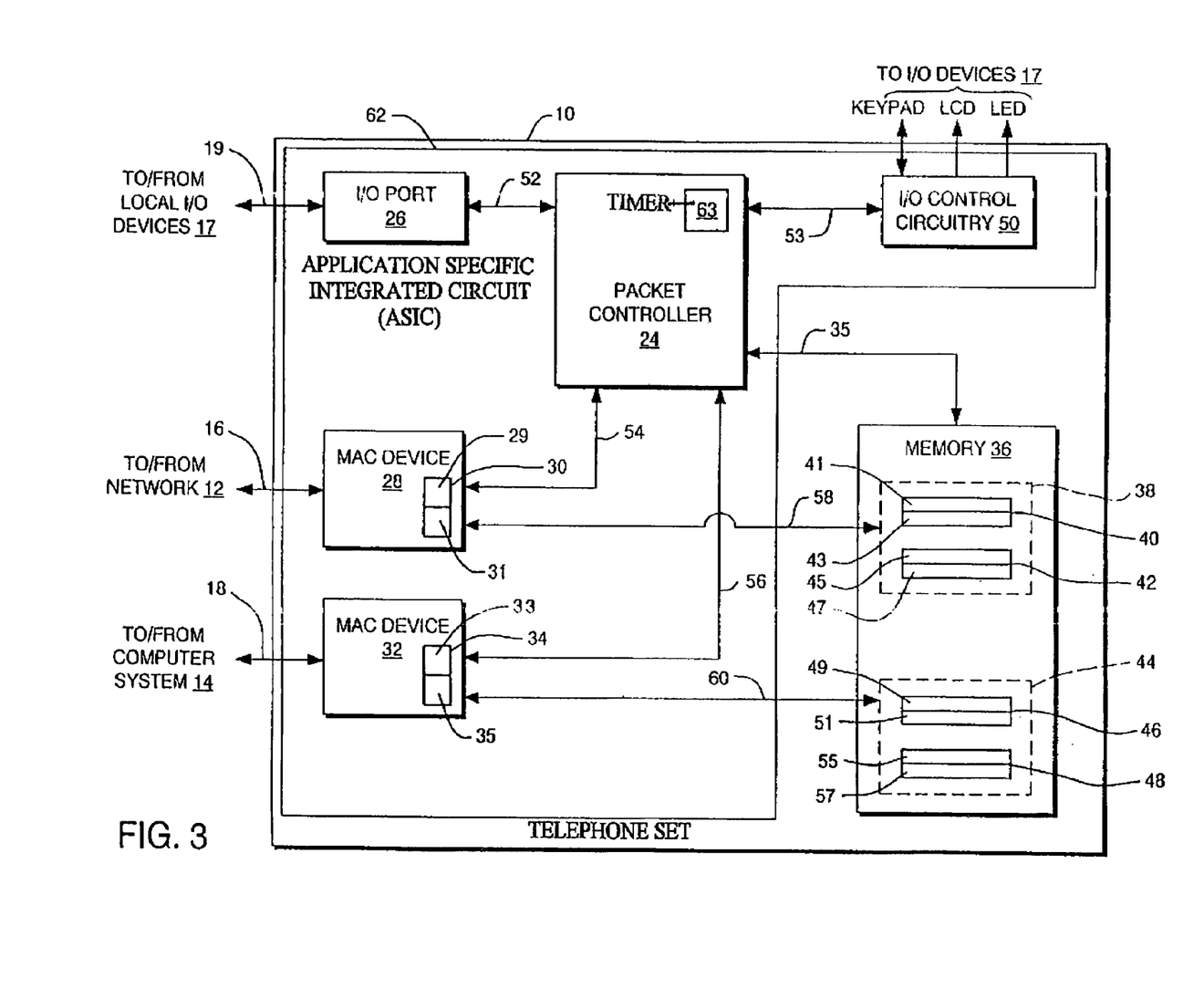
FIG. 3 is a diagram of an embodiment of the packet forwarding system of FIG. 2, including a packet controller.

FIG. 3 shows, in more detail, an exemplary embodiment of the telephone set 10. The telephone set 10 includes a packet controller 24 coupled to an input/output (I/O) port 26, two media access control (MAC) devices 28 and 32, memory 36, and I/O control circuitry 50. An outline 62 encloses those components 24, 26, 28, 32, and 50 that, in one embodiment of the invention, are disposed on an integrated circuit device (ASIC). It will be appreciated that other ASIC designs are possible, such as, for example, one in which the memory 36 is included on the ASIC.

The I/O port 26 is in electrical communication with the I/O devices 15, (i.e., the microphone, headset, or the handset), to receive audio signals from a user of the telephone set 10 and to transmit audio signals to the I/O devices 15, (e.g., the speaker or the handset), so that such signals are audible to the user. The I/O control circuitry 50 is coupled to I/O devices 15, (e.g., the keypad, the LCD, and the LED), to receive input signals from the keypad and to transmit control signals to the LCD and the LED.

The packet controller 24 is in electrical communication with the I/O port 26 by signal line 52 and with the I/O control circuitry 50 by signal line 53. The packet controller 24 is in electrical communication with the memory 36 via signal lines 35, with the MAC device 28 via signal lines 54, and with the MAC device 32 via signal line 56 to control the transfer of packets between the memory 36 and the MAC devices 28 and 32. The packet controller 24 includes a timer 63 used to set a maximum limit on the amount of time that a packet prepared for transmission is allowed await transmission, as described below. In one embodiment, the timer 63 is programmable so that different maximum time limits can apply to different levels of packet priority.

In the embodiment, the MAC devices 28, 32 are 10/100 Ethernet ports capable of operating at a 100 Mbps network data rate. The MAC devices 28, 32 are the logical interfaces for receiving and transmitting packets to the Ethernet networks 12, 14. Each MAC device 28, 32 provides a separate collision domain for packets being transmitted on the respective communication paths 16, 18. The first collision domain is the network segment that includes the MAC device 28 in electrical communication with the network 12 via communication path 16. The second collision domain includes the MAC device 32 in electrical communication with the computer system 14 via communication path 18.

As a result of the separate collision domains, the MAC devices 28, 32 operate such that both can concurrently transmit packets and/or concurrently receive packets, or one of the MAC devices can receive packets while the other transmits packets, without collisions occurring between networks.

Each MAC device 28, 32 includes buffer memory 30, 34 for storing packets prepared for transmission to the network 12 or packets received from network 12 via the communication paths 16, 18. The buffer memory 30, 34 includes a receive buffer 29, 34 and a transmit buffer 31, 35. In one embodiment, the buffer memory 30, 34 is sized to store 8 or 16 bytes of data. The buffer memory 30, 34 can be internal or external to the MAC devices 28, 32. In one embodiment, each MAC device 28, 32 includes a buffer controller for handling packet transfers to and from the buffer memory. Other embodiments combine the controllers in a single component or incorporate the buffer controller within the packet controller 24.

The memory 36 can be implemented using synchronous dynamic random access memory (SDRAM). Other types of memory devices can be used (e.g., SRAM). The organization of the memory 36 provides separate, dedicated memory sections 38, 44 for each of the MAC devices 28, 30. The separate sections 38, 44 operate to maintain the separate collision domains provided by the MAC devices 28, 30. Memory section 38 supports the MAC device 28 via signal lines 58 and the memory section 44 supports the MAC device 32 via signal lines 60.

The memory sections 38, 44 are each partitioned into a receive region 40, 46 and a transmit region 42, 48. Each receive region 40, 46 is partitioned into a specific block 41, 49 for storing packets addressed to the telephone set 10 and a general block 43, 51 for storing packets addressed to a device other than the telephone set 10. Each transmit region 42, 48 is partitioned into a priority block 45, 55 for packets having priority and a general block 47, 57 for non-prioritized packets.

Other ways of using the memory 36 to implement priority are contemplated. For example, the memory 36 can be organized as a buffer to store packets as the packets arrive at the telephone set. Rather than evaluate each packet as that packet arrives to determine the block of memory in which to store that packet, each packet can be directly stored in the memory 36 upon arrival and subsequently examined for prioritizing when selecting a packet to forward to one of the I/O devices.

Each packet received by a MAC device from the network 12 includes the necessary information for determining the location in memory 36 to store the packet. Categories of packets include "telephone-specific," "telephone-general," or "general other." The telephone set 10 uses (i.e., performs an action as prescribed by the information in the packet) telephone-specific and telephone-general packets. Examples of actions include converting packets with voice data into audio signals and outputting the audio signals to a local I/O device 17, displaying a message on the LCD, resetting error flags, setting the current time on a internal clock of the telephone set 10, and other housekeeping functions.

The telephone set 10 forwards telephone-general packets, but not telephone-specific packets, to the computer system 14. An example of telephone-general packets are those packets produced during a conference call. Both categories of packets, telephone-specific and telephone-general, are stored within the specific block 41, 49 of the receive region 40, 46. Packets that are general-other are stored in the general block 43, 51 and subsequently forwarded to the computer system 14. The telephone set 10 does not use such packets.

Figure 4:
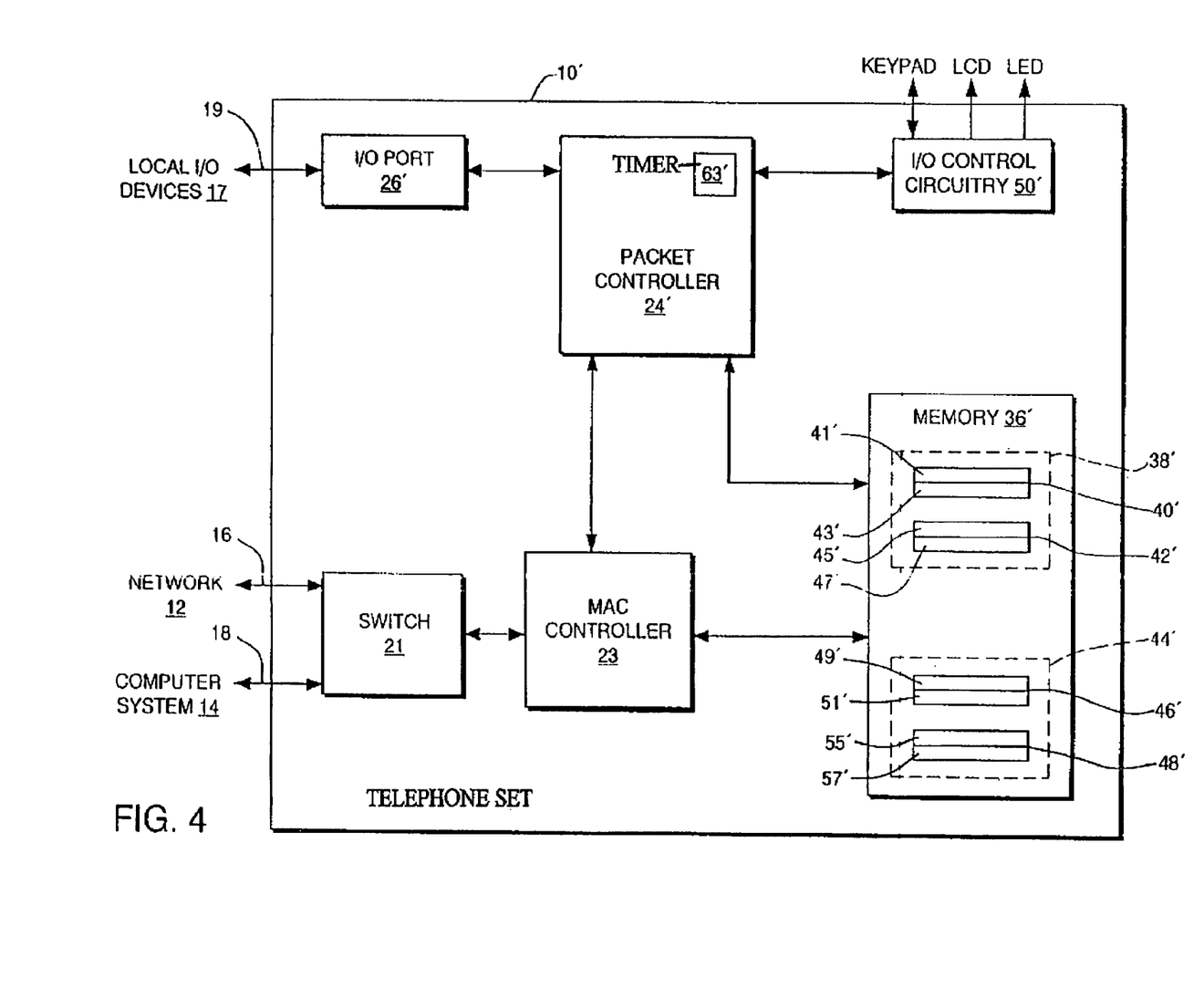
FIG. 4 is a diagram of another embodiment of the packet forwarding system of FIG. 2, including a packet switching device.

FIG. 4 shows another embodiment 10' of the telephone set 10 in FIG. 3. The telephone set 10' includes a packet controller 24' coupled to an input/output (I/O) port 26', a MAC interface 23, memory 36', and I/O control circuitry 50'. The MAC interface 23 is in electrical communication with a packet switching device 21 for forwarding packets between the network 12 and the computer system 14. In another embodiment, the MAC interface 23 can be removed to allow direct connection from the packet controller 24' to the switching device 21. The above descriptions for the packet controller 24, I/O port 26, memory 36, I/O control circuitry 50 in FIG. 3 are the same as the corresponding components in FIG. 4. The MAC interface 23 provides an interface that controls the communication between the network 12 and the computer system 14 with the telephone set 10'.

The switching device 21 provides a function accomplished by the two MAC devices 28, 32 of FIG. 3, which is to maintain separate collision domains for the network 12 and the computer system 14. The switching device 21 can be implemented using an NP313, a 3-port Fast Ethernet Integrated Circuit developed by NeoParadigm Labs, Inc. (NPL). The manner in which the switching device 21 can handle packets includes the following: the switching device 21 can forward a packet from the network 12 to the computer 14 (or in the opposite direction), the switching device 21 can ignore a packet received from either the network 12 or the computer 14; and the switching device 21 can use a packet to perform an action as prescribed by that packet, without forwarding the packet to either the network 12 or the computer 14.

A current impediment to the use of the switching device 21 is the costs associated with the hardware and software needed to implement the operation of the device 21 according to IEEE standards. This impediment can be eliminated over time if the costs of the switching device 21 decrease.

Figure 5:
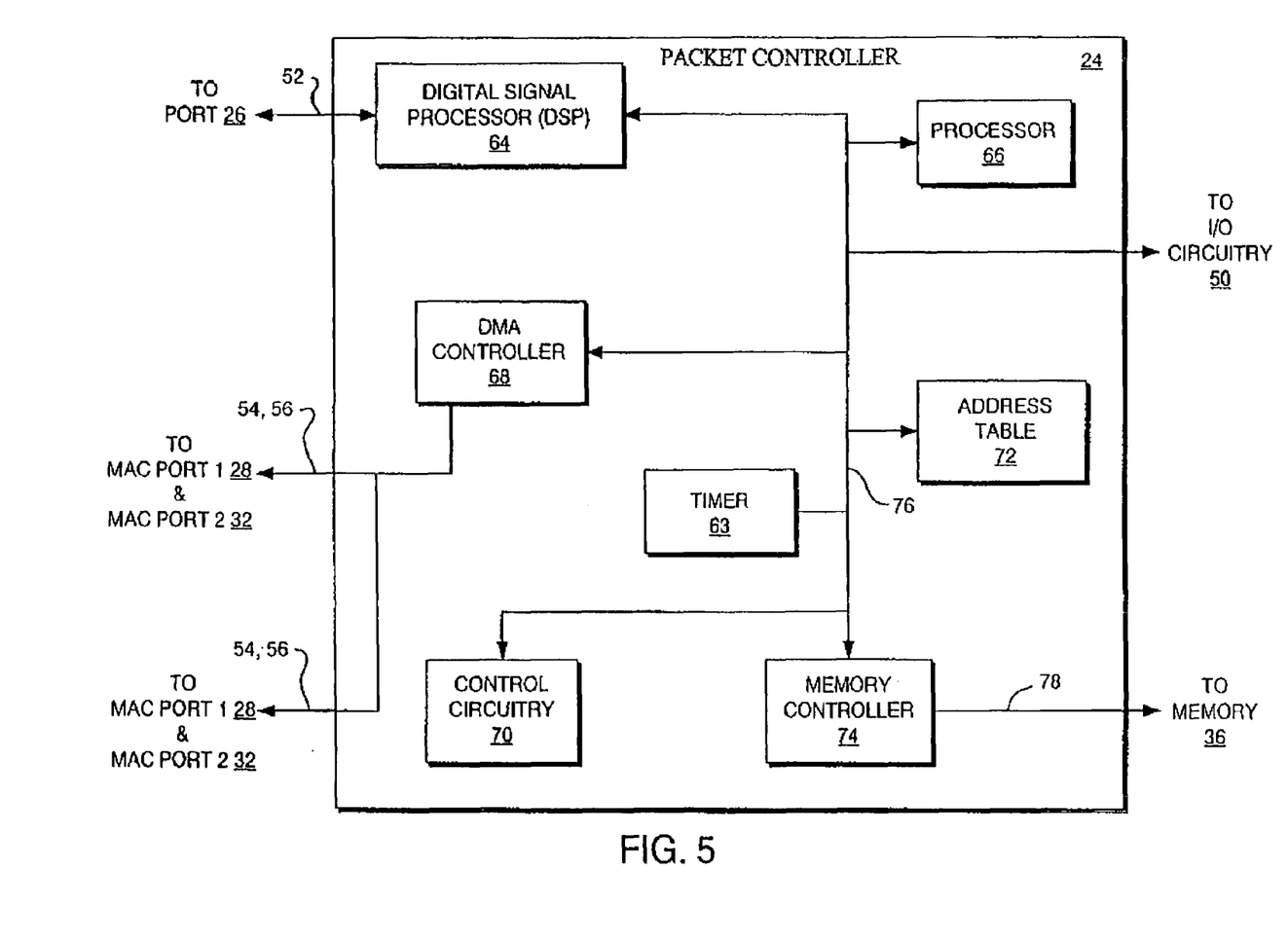
FIG. 5 is a diagram of an embodiment of the packet controller of FIG. 3.

FIG. 5 shows an exemplary embodiment of the packet controller 24. The packet controller 24 includes a timer 63, a digital signal processor (DSP) 64, a processor 66 (e.g., an ARM processor), a direct memory access (DMA) controller 68, control circuitry 70, an address table 72, and a memory controller 74 coupled to each other by a signal bus 76. Although shown separately, the timer 63 and the table 72 can be included within one of the other functional components 66, 68, 70, and 74.

The DSP 64 is in electrical communication with the I/O port 26 by signal lines 52. The memory controller 74 is in electrical communication with the memory 36 by signal lines 78. The DMA controller 68 is in electrical communication with the MAC devices 28, 32 by signal lines 54, 56. In one embodiment, the memory controller 74 can be included in the DMA controller 68. Either the processor 66 or the DMA controller 68 can control the transfer of memory between the MAC devices 28, 32 and the memory 36.

The address table 72 stores addresses that are of importance to the telephone set 10. Examples of such addresses include the address of the telephone set 10, the identifier for a conference call, and a general broadcast address.

The DMA controller 68 accesses the table 72 whenever the telephone set 10 receives a packet to determine whether the telephone set 10 uses the packet as described above. When the packet has a destination address matching one of the addresses stored in the table 72, the telephone set 10 performs an action as prescribed by the packet. The telephone set 10 may or may not subsequently forward the packet to the network 12 or the computer system 14, as explained above.

In one embodiment, the table 72 also functions to filter out packets from subsequent forwarding by including addresses of the computer system 14. In this embodiment, the DMA controller 68 uses the addresses stored in the table 72 to discard, rather than forward, packets that are neither addressed to the telephone set 10 nor the computer system 14.

Destination addresses can be added to or removed from the table 72. For example, when a conference call starts, the processor 66 (or the DMA controller 68) stores the conference call identifier in the table 72 and removes the identifier when the conference call ends. Implementation of this table 72 can be in hardware or software, but the lookup of addresses in the table 72 occurs faster when implemented in hardware in the described embodiment.

Packet Forwarding Operation

The following description describes the packet forwarding process along a path from the network 12 and the MAC device 28 to the MAC device 32 and the computer system 14. However, it is to be understood that the process functions similarly in the reverse direction. When the MAC device 28 receives a packet, the MAC device 28 stores that packet in the receive buffer 29. The DMA controller 68 moves the received packet from the receive buffer 29 to the receive region 40 of the memory 36 and compares the destination address of the packet against the addresses stored in the address table 72. If the addresses match, then the telephone set 10 uses the packet, as explained previously.

When there is no address match or when the packet is a telephone-general packet, then the packet moves from the receive region 40 to the transmit region 42 for subsequent forwarding to the computer system 14. The processor 66 evaluates the packet to determine in which block, 45 or 47, of the transmit region 42 to place the packet. If the packet has priority, then the processor 66 places the packet in the priority block 45. If the packet has no priority status, then the processor 66 places the packet in the general block 47 or gives the packet a priority status and then places the packet in the priority block 45.

From the transmit region 40, the DMA controller 68 moves the packet to the transmit buffer 35 of the MAC device 32, which shifts the packet onto the communication path 18 to the computer system 14. When processing a series of packets, the DMA controller 68 continually supplies the memory 36 with packets and keeps the transmit buffer 35 of the MAC device 32 full.

Packet Generating Operation

Figure 6:
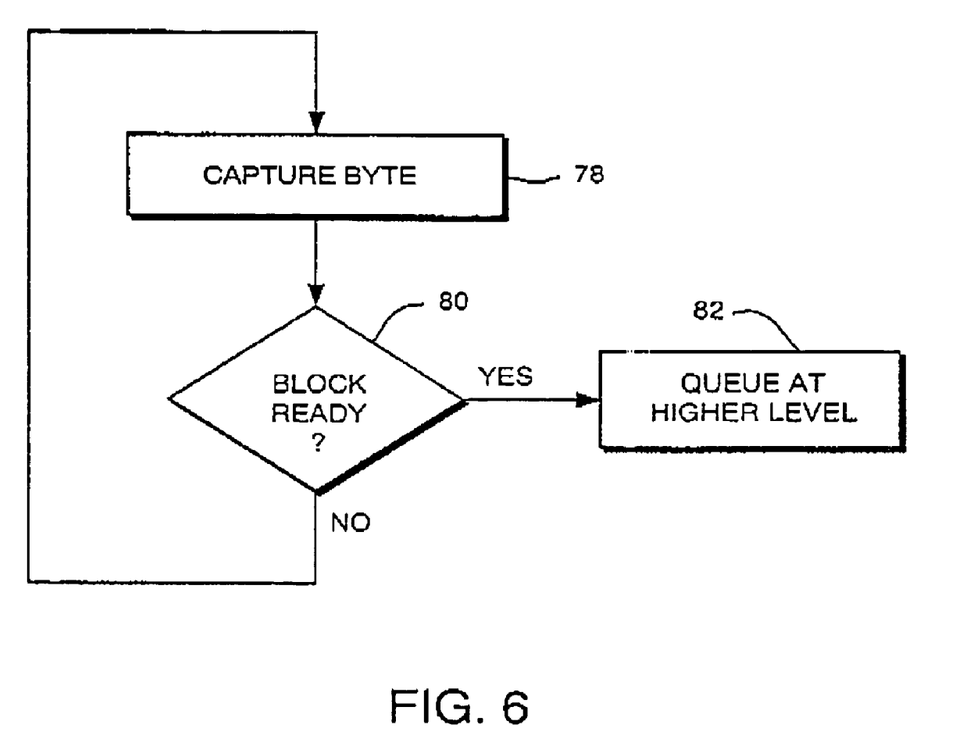
FIG. 6 is a flow chart representation of an embodiment of a process by which packets are generated and queued within the packet forwarding system.

FIG. 6 provides a flow chart describing a process by which the packet controller 24 constructs voice data packets from audio signals received by the I/O port 26. The generated packets can be unicast or multi-cast packets for use in an end-to-end telephonic communication or in a conference call. In step 78, the DSP 64 digitizes consecutive samples of audio signals and concatenates the digitized signals into a data structure including voice data corresponding to the audio signals. When the data structure includes voice data generated from audio signal samples that span a predetermined duration, (e.g., 24 ms), the DSP 64 signals the processor 66 (Step 80). The processor 66 builds a frame around the data structure and produces, in one embodiment, an Ethernet packet. Because of the time-sensitive nature of voice data, the processor 66 may add data to the data structure that indicate that the packet has priority. In step 82, the packet is queued in the priority block 45, 55, of the transmit section 42, 48. The DMA controller 68 subsequently passes the packet in the priority block 45, 55 to the MAC device 28, 32 for transmission as an Ethernet packet.

On-time Delivery

When moving packets from the memory 36 to the MAC devices 28, 32, the DMA controller 68 gives priority to packets stored in the priority block 45, 55. Priority operates to increase the importance of certain packets so that such packets receive special treatment for getting onto one or both of the networks 12, 14. The ability of the telephone set 10 to concurrently forward non-prioritized packets and generate prioritized packets can produce occasions where a packet of low importance is queued in a MAC device, waiting to be forwarded, when a time-sensitive voice packet is generated. For voice data to be useful, typically, such data must get to the destination within a certain time period (i.e., up to about 50 ms), whereas the critical period of time for delivery of control data is generally longer. Other types of data may not be time-sensitive.

Rather than wait until the queued packet leaves the transmit buffer of the MAC device, and risk reducing the usefulness of the voice data packet, the processor 66 can preempt the transmission of that packet and replace that packet with the higher priority voice data packet. The processor 66 can discard the replaced packet, or store the packet until the voice transmission finishes, at which time the transmission of the replaced packet resumes. Giving high priority to voice data packets facilitates on-time delivery of real-time data.

Figure 7:
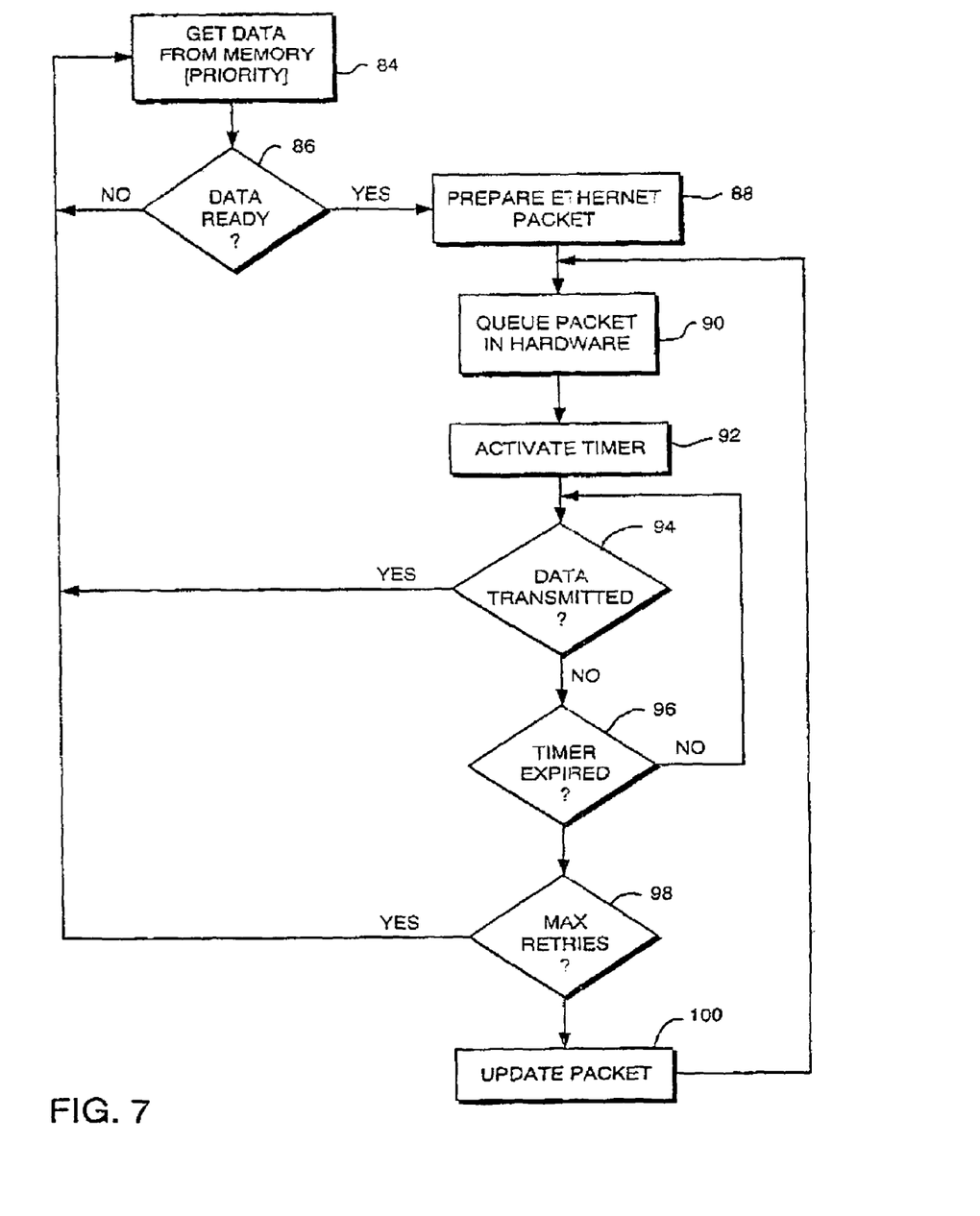
FIG. 7 is a flowchart representation of an embodiment of a process by which the packets are forwarded to the network or modified for subsequent transmission.

FIG. 7 shows a process that further facilitates on-time delivery of time-sensitive data, such as voice data, by keeping packets from being unduly postponed while awaiting transmission from a MAC buffer 30, 34. The process ensures that packets do not remain in the transmit buffer 31, 35 of a MAC device 28, 32, beyond a predetermined period of time. For illustration purposes, the following description of the steps in the process are described with reference to the MAC device 28, although such steps also apply to the MAC device 32. Also, though the steps in the process are described below with specific reference to packets containing voice data, it is to be understood that the principles of the invention apply to packets having any type of data, including video data and control data, and whether or not such data are time sensitive.

In Step 84, the packet is obtained from the priority block 41 of the transmit region 42 in memory 36. As described above, the DSP 64 captures voice data for a predetermined duration (step 86), and the processor 66 forms an Ethernet packet including the captured voice data (step 88). In step 90, the DMA controller 68 (or processor 66) queues the Ethernet packet in the transmit buffer 31 of the MAC device 28.

When the packet is queued, the timer 63 is started (step 92). The timer 63 is set for a maximum period of time, for example 2 ms, that the packet can remain in the transmit buffer 31. This maximum period can be constant or variable from packet to packet. If the packet is transmitted before the timer 63 expires, the timer 63 stops and the process continues with the next available packet in the transmit region 42 of the memory 36 (step 94).

When the timer 63 expires, a determination is made as to whether the packet is in the process of being transmitted. If the packet is not currently being transmitted when the timer 63 expires, the transmission is canceled. Canceling the transmission of a queued packet does not impair the ability of the MAC device 28 to receive packets over the communication path 16. In another embodiment, rather than cancel the transmission, attempts to transmit the packet can be allowed to continue. This can be a more practical action to take when the timer 63 is set to a time period that is too short for the type of data being transmitted (e.g., non-time-sensitive data).

If, when the timer 63 expires, the transmission of the packet is in progress, the command to halt may not affect the transmission of that packet, allowing the transmission of the packet onto the network to complete. In another embodiment, the transmission of the packet can be interrupted.

At step 100, when the timer 63 is expired, the processor 66 determines to replace the queued packet, whether or not that packet is currently being transmitted, with a new packet. The information in the new packet can be entirely different from, have similarities with, or be identical to the information in the replaced packet. For example, the replaced packet can include time-sensitive data and protocol-related data, and the new packet can have the same time-sensitive and the same protocol-related data as the replaced packet. In other embodiments, the new packet can have the same time-sensitive data and different protocol-related data than the replaced packet, or different time-sensitive data and the same protocol-related data as the replaced packet, or different time-sensitive data and different protocol-related data than the replaced packet.

The processor 66 can use any of a variety of techniques to produce time-sensitive data for the new packet that are different from the time-sensitive data of the replaced packet. For example, the processor 66 can replace the time-sensitive data of the replaced packet with entirely new time-sensitive data, append new time-sensitive data to the time-sensitive data of the replaced packet, or append new time-sensitive data to a compressed, selected portion of the time-sensitive data of the replaced packet. The processor 66 can produce the new packet by modifying the replaced packet while the replaced packet remains within the transmit buffer 31 of the MAC device 28. In another embodiment, the new packet can be generated in memory 36 and then passed to the transmit buffer 31 of the MAC device 28.

Within the transmit buffer 31, the new packet receives an initial back-off level, that is, the new packet does not inherit the back-off level incurred by the replaced packet. The timer 63 resets to allow the full time limit within which to transmit the new packet and begins attempts to transmit the new packet over the network.

This process places a limit on the number of updates to the packet. For example, the limit is 12, which, when multiplied by the exemplary 2 ms time-out period produces a 24 ms time limit to forward a voice data packet. This 24 ms time limit corresponds to the duration covered by the voice data in the packet and to the period of time for which that voice data may have any practical value at the receiver. Other embodiments can use various combinations of update limits and time-out periods to achieve the objective of forwarding the voice data packet while the packet remains useful.

In step 98, if the number of updates to the packet for a particular block of voice data exceeds that maximum value (e.g., 12), then no additional updates related to that particular block of voice data occur. The voice data is discarded, and the next packet including a new block of voice data transfers from the transmit region 42 of the memory 36 to the transmit buffer 31 of the MAC device 28.

While the invention has been shown and described with reference to specific preferred embodiments, it should be understood by those skilled in the art that various changes in form and detail may be made therein without departing from the spirit and scope of the invention as defined by the following claims.

We claim:

1. A method for forwarding packets to a network, comprising the steps of:
    providing a packet forwarding system with a memory, said packet forwarding system being connected to the network;
    receiving an analog signal and generating local audio packets;
    receiving packets at the packet forwarding system including local audio packets and storing the packets in the memory of the packet forwarding system;
    attempting to forward packets stored in the memory to the network;
    establishing one or more time limit within which to forward packets stored in the memory to the network with the time limit linked to the type of the data included in the packet;
    monitoring an elapsed period of time while attempting to forward packets stored in the memory to the network;
    canceling said attempting to forward a packet stored in the memory to the network, when the elapsed period of time exceeds the time limit associated with the type of the data included in the packet; and
    allowing transmission of the packet stored in the memory to be completed when that packet is currently being transmitted over the network.

2. A method for forwarding packets to a network, comprising the steps of:
    providing a packet forwarding system with a memory, said packet forwarding system being connected to the network;
    receiving an analog signal and generating local audio packets;
    receiving packets at the packet forwarding system including local audio packets and storing the packets in the memory of the packet forwarding system;
    attempting to forward packets stored in the memory to the network;
    establishing one or more time limit within which to forward packets stored in the memory to the network with the time limit linked to the type of the data included in the packet;
    monitoring an elapsed period of time while attempting to forward packets stored in the memory to the network;
    canceling said attempting to forward a packet stored in the memory to the network, when the elapsed period of time exceeds the time limit associated with the type of the data included in the packet; and
    interrupting transmission of the packet stored in the memory when that packet is currently being transmitted over the network.

3. A method for forwarding packets to a network, comprising the steps of:
    providing a packet forwarding system with a memory, said packet forwarding system being connected to the network;
    receiving an analog signal and generating local audio packets;
    receiving packets at the packet forwarding system including local audio packets and storing the packets in the memory of the packet forwarding system;
    attempting to forward packets stored in the memory to the network;
    establishing one or more time limit within which to forward packets stored in the memory to the network with the time limit linked to the type of the data included in the packet;
    monitoring an elapsed period of time while attempting to forward packets stored in the memory to the network; and
    canceling said attempting to forward a packet stored in the memory to the network, when the elapsed period of time exceeds the time limit associated with the type of the data included in the packet; and
    resetting a timer to allow a period of time for additional attempts to forward the packet stored in the memory when that packet is not currently being transmitted over the network.

4. A method for forwarding packets to a network, comprising the steps of:
provi​ding a packet forwarding system with a memory, said packet forwarding system being connected to the network;
receiving an analog signal and generating local audio packets;
receiving packets at the packet forwarding system including local audio packets and storing the packets in the memory of the packet forwarding system;
attempting to forward packets stored in the memory to the network;
establishing one or more time limit within which to forward packets stored in the memory to the network with the time limit linked to the type of the data included in the packet;
monitoring an elapsed period of time while attempting to forward packets stored in the memory to the network; and
canceling said attempting to forward a packet stored in the memory to the network, when the elapsed period of time exceeds the time limit associated with the type of the data included in the packet; and
replacing the packet stored in memory with a new packet including the same data as the replaced packet when it is determined to cancel the forwarding of the stored packet.

5. The method of claim 4 wherein: said new packet includes different data than the replaced packet when it is determined to cancel the forwarding of the stored packet.

6. The method of claim 5 wherein the packet stored in memory includes time-sensitive data and protocol-related data, and the new packet has the same time-sensitive data and different protocol-related data as the replaced packet.

7. The method of claim 6 further comprising the steps of:
resetting a back-off level; and
attempting to forward the new packet to the network.

8. The method of claim 6 further comprising the steps of:
initiating attempts to transmit the new packet to the network; and
resetting the elapsed period of time.

9. The method of claim 6 wherein the packet stored in memory includes time-sensitive data and the step of replacing the packet stored in memory with a new packet can occur a predetermined maximum number of times.

10. The method of claim 5 wherein the packet stored in memory includes time-sensitive data and protocol-related data, and the new packet has different time-sensitive data and the same protocol-related data as the replaced packet.

11. A method for forwarding packets to a network, the method comprising the steps of:
providing a packet forwarding system with a memory, said packet forwarding system being connected to the network;
creating a first packet at the packet forwarding system and storing said first packet in said memory of said packet forwarding system;
attempting to forward said first packet stored in said memory to the network;
establishing a time limit within which to forward said first packet stored in said memory to the network;
monitoring an elapsed period of time during said attempting to forward said first packet stored in said memory to the network;
canceling said attempting to forward said first packet stored in said memory to the network when said elapsed period of time exceeds said time limit and said first packet has not been forwarded;
creating a second packet at said packet forwarding system after said creating of said first packet, said creating of said second packet including combining data of said first packet with additional data to create data for said second packet;
replacing said first packet in said memory with said second packet after said canceling; attempting to forward said second packet to the network after said replacing.

12. A method in accordance with claim 11, further comprising:
establishing a time limit within which to forward said second packet stored in said memory to the network;
monitoring an elapsed period of time during said attempting to forward said second packet stored in said memory to the network;
canceling said attempting to forward said second packet stored in said memory to the network when said elapsed period of time exceeds said time limit and said second packet has not been forwarded;
creating a third packet at said packet forwarding system, said creating of said third packet includes combining data of said second packet with additional data to create data for said third packet;
replacing said second packet in said memory with said third packet after said canceling; attempting to forward said third packet to the network after said replacing.

13. A method in accordance with claim 12, further comprising: limiting a number of steps of said combining of data from a previous packet with additional data to below a predetermined retry maximum.

14. A method in accordance with claim 11, further comprising: finishing forwarding said first packet if said first packet is being forwarded when said elapsed period of time exceeds said time limit.

15. A method in accordance with claim 11, further comprising: interrupting forwarding said first packet if said first packet is being forwarded when said elapsed period of time exceeds said time limit.

16. A method in accordance with claim 11, wherein: said creating of said second packet includes creating new data for said second packet.

17. A method in accordance with claim 11, wherein: said steps of monitoring, establishing said time limit, and canceling forwarding of said first packet occur only when said first packet includes time-sensitive data.

18. A method in accordance with claim 11, wherein: said creating of said first packet is performed using local audio as a data portion of the packet.

19. A method in accordance with claim 11, wherein: said forwarding of said packets to the network is interrupted during said attempting to forward said first packet to the network.

20. A method in accordance with claim 19, wherein:
said creating of said first packet is performed using local audio as a data portion of the packet;
said creating of said second packet includes combining data of said first packet with additional local audio to create data for said second packet.

21. A method in accordance with claim 11, wherein: said attempting includes waiting for a free period on the network and forwarding said first packet to the network during a first said free period.

22. A method in accordance with claim 11, further comprising: receiving another packet at said packet forwarding system from another network, said network and said another network having separate collision domains.

23. A method in accordance with claim 11, wherein said step of receiving packets includes receiving a packet at said packet forwarding system from a network collision domain that is different from the collision domain associated with the forwarding device.

24. A network method for forwarding packets, the method comprising:
   providing a device with a local audio source and a packet controller for forming local audio packets;
   providing a packet forwarding device with a memory, said packet forwarding device being connected to the device and being connected to a first collision domain and a second collision domain;
   receiving packets at the packet forwarding device from the device, from the first collision domain and from the second collision domain and storing the packets in the memory of the packet forwarding system;
   providing a time limit for local audio packets to be held in the memory;
   attempting to forward packets stored in the memory to any one of the device and the first collision domain and the second collision domain;
   monitoring an elapsed period of time while attempting to forward the local audio packet stored in the memory to one of the first collision domain and the second collision domain; and
   canceling said attempting to forward the local audio packet stored in the memory to the one of the first collision domain and the second collision domain, wherein said audio packet contains time sensitive audio data and no time limit or a different time limit is established for packets received from one of said first collision domain and said second collision domain other than for packets received with audio data.

25. A method in accordance with claim 24, wherein the device with a local audio source and the packet forwarding device and memory are part of a network telephone device and the first collision domain is in one of a local area network, wide area network and internet protocol network and the second collision domain is a connected computer device.

* * * * *